United States Patent Office 3,258,492
Patented June 28, 1966

3,258,492
P-CHLORO OR HYDROXY BENZYL TERTIARY PHOSPHINE OXIDES
Paul E. Ritt, Fairfax, and Lee M. Kindley, Springfield, Va., assignors to Melpar, Inc., Falls Church, Va., a corporation of Delaware
No Drawing. Original application Dec. 6, 1960, Ser. No. 73,959, now Patent No. 3,213,057, dated Oct. 19, 1965. Divided and this application July 22, 1965, Ser. No. 484,154
4 Claims. (Cl. 260—606.5)

INTRODUCTION

This application is a division of our application Serial No. 73,959, filed December 6, 1960, now U.S. Patent Number 3,213,057, issued October 19, 1965, and entitled, "Organo-Phosphorus Compounds."

This invention generally relates to the preparation of new organo-phosphorus compounds. More particularly this invention, according to one embodiment, relates to the preparation of fire retardant and thermally stable plastic materials by incorporating phosphorus atoms into organic molecules having two or more epoxide groups. In another embodiment, this invention also relates to the preparation of certain novel phosphine oxides.

BACKGROUND

Numerous methods of achieving greater thermal stability and/or fire retardance in plastic materials have been suggested. This is done by varying the structure of a pure organic material, addition of inorganic "fillers," incorporation of metallic or metalloid atoms in the molecule, incorporaton of halogen atoms in the molecule, etc.

Phosphorus has been incorporated in esters used as flame retardant plasticizers. It has also been used in vinyl type polymers and in epoxides containing only one epoxide group.

Prior to the present invention, polymers containing phosphorus were characterized by one or more of the following disadvantages: (1) water solubility; (2) instability towards hydrolysis. Phosphorus compounds containing one epoxide group behave as reactive diluents in epoxide resin formulations rather than as a two or three dimensional polymer.

OBJECTS

It is therefore a primary object of this invention to prepare new organo-phosphorus compounds. Another object of this invention is to prepare novel and useful fire retardant and thermally stable plastic materials by incorporating phosphorus atoms into organic molecules having two or more epoxide groups. A further object is to prepare new phosphine oxides. These and other objects will appear in the following description and claims.

THE NOVEL PRODUCTS OF THE INVENTION

The novel products of primary commercial importance in accordance with this invention can be characterized by the formula:

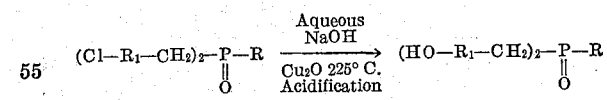

wherein:

$R_1$ represents the group

$n$ represents either 0 (for a pure compound) or an integer between 1 and 4 (for the polymer); and
R broadly represents an alkyl or aryl group, the alkyl group preferably having 1–8 carbon atoms and most preferably is a methyl, ethyl, propyl or butyl group—and the aryl group is preferably phenyl.

PREPARATION OF THE NOVEL PRODUCTS

It is possible to produce the novel products of this invention in a number of ways. One of the preferred methods involves three steps, as follows:

(1) Reaction of a phosphonyl chloride having the formula

with a Grignard reagent having the formula $$Cl-R_1-CH_2MgCl$$

to produce a chlorine substituted tertiary phosphine oxide having the formula

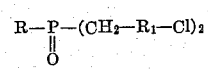

and magnesium chloride, where in the above formulas R broadly represents an alkyl or aryl group, the alkyl group preferably having 1–8 carbon atoms and most preferably is a methyl, ethyl, propyl or butyl group—and the aryl group is preferably phenyl, and $R_1$ represents the group

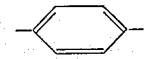

(2) Hydrolysis of the said chlorine substituted tertiary phosphine oxide to yield the corresponding phenolic tertiary phosphine oxide as follows:

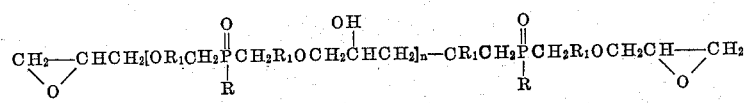

The hydrolysis is a closed system reaction carried out in a bomb (see Examples I–IV).

(3) Reaction of said phenolic tertiary phosphine oxide with epichlorohydrin to yield a diepoxide or an epoxde resin having terminal epoxide groups, as follows:

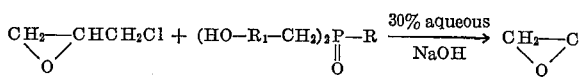

wherein *n* represents either 0 or an integer between 1 and 4, depending upon the molar ratios of epichlorohydrin, phenolic tertiary phosphine oxide and sodium hydroxide (see Example III).

Alternative processes will readily suggest themselves to those skilled in the art. For example, in preparing the chlorine substituted tertiary phosphine oxide, phosphorus oxychloride, $POCl_3$ may be used instead of the phosphonyl dichloride

set forth in step 1. The chlorine substituted tertiary phosphine oxide obtained by this alternate procedure would have the formula

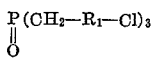

and can be hydrolyzed to a phenolic tertiary phosphine oxide having the formula

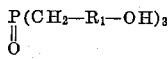

which can then be reacted with epichlorohydrin in the manner described relative to aforementioned steps 2 and 3.

Another modification of the above process would involve using the phosphonyl chloride

wherein R and $R_2$ may be the same or different alkyl or aryl groups, instead of the phosphonyl dichloride

set forth in step (1) above. In such a case the chlorine substituted tertiary phosphine oxide would have the formula

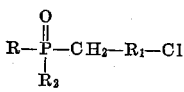

The product resulting from the hydrolysis of the chlorine substituted tertiary phosphine oxide as set forth in step (2) would be the phenolic tertiary phosphine oxide having the formula

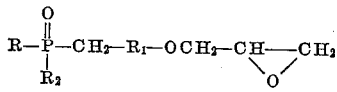

Examples

The following examples are illustrative of preferred embodiments of the present invention. It should be understood that these examples are not intended to limit the invention and that obvious changes may be made by those skilled in the art without changing the essential characteristics and the basic concept of the invention. The parts and percentages are by weight, the temperature is room temperature and the pressure is atmospheric, unless otherwise indicated.

*Example I.—Preparation of bis(p-chlorobenzyl) methylphosphine oxide*

A Grignard reagent was prepared in the usual manner from p-chlorobenzyl chloride, 53.5 g. (0.33 mole), and magnesium, 8 g. (0.33 gram atom) in ethyl ether. Methyl phosphonyl dichloride, 10.9 g. (0.082 mole), in benzene was added to the cooled well-stirred Grignard reagent.

After the addition was complete, the reaction mixture was gently refluxed for 2 hours, then allowed to stir at room temperature overnight. The mixture was cooled and hydrolyzed by adding dropwise a cold solution of 50 g. $NH_4Cl$ in 250 ml. water. The layers were separated, and the water layer was washed three times with 50 ml. portions of benzene. The organic layer and washings were combined, and approximately 15 ml. of 10 percent alcoholic KOH was added to precipitate any magnesium which might be present as a complex and to combine with any phosphonic acids which may have formed. A small amount of material precipitated upon addition of the alcoholic KOH and this was removed by filtration. The reaction mixture was then distilled at atmospheric pressure to remove solvent. The pressure was reduced to 10 mm. and 8.1 g. of p-chlorotoluene distilled over at 50° C. The pressure was further reduced to 0.1 to 0.3 mm. and a mixture of bis(p-chlorobenzyl)methylphosphine oxide and the coupling compound, 4,4'-dichlorobibenzyl distilled over a range of 110° to 235° C. and solidified immediately in the receiver. The solid distillate was recrystallized from benzene to yield 9.5 g. (37.0% of the theoretical) of white crystals. M.P. 145–7° C.

*Analysis.*—Calculated for $C_{15}H_{15}OPCl$: C, 57.5%; H, 4.8%; P, 9.9%; Cl, 22.7%. Found: C, 57.9%; H, 5.4%; P, 9.2%; Cl, 22.7%.

*Example II.—Preparation bis(p-hydroxybenzyl) methylphosphine oxide*

Sodium hydroxide, 4.8 g. (0.12 mole), in 50 ml. water and $Cu_2O$, 1.8 g. were mixed with bis(p-chlorobenzyl) methyl-phosphine oxide, 9.3 g. (0.03 mole), and introduced into a rocker-type bomb. The reaction mixture was agitated (by rocking) for 16 hours at 225° C. (temperature inside bomb). After cooling the reaction mixture was filtered to remove $Cu_2O$ catalyst and unreacted starting material. The filtrate was extracted with two 50 ml. portions of ether. A sample of the water layer was analyzed for $Cl^-$ ion. The analysis indicated that the hydrolysis was 62.8% complete. Carbon dioxide was bubbled through the water layer until the pH was about 8. The solid, white material which precipitated was filtered, washed with water and dried. Yield 1.25 g. (15.1% of theoretical) M.P. 260–3° C.

*Analysis.*—Calculated for $C_{15}H_{17}O_3P$: C, 65.3%; H, 6.17%; P, 11.2%. Found: C, 64.5%; H, 5.82%; P, 11.1%.

*Example III.—Preparation of p-chlorobenzyldimethylphosphine oxide*

The compound was prepared by a Grignard reaction as follows:

(1)
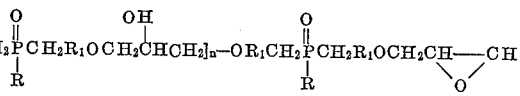

(2)
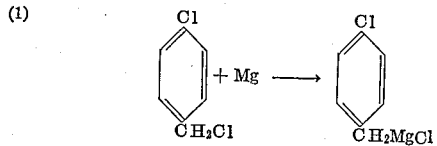
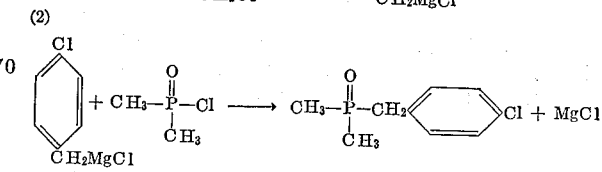

The Grignard reagent was prepared in the usual manner from p-chlorobenzyl chloride, 16.1 g. (0.1 mole), and magnesium, 2.4 g. (0.1 mole), in ethyl ether. Dimethyl phosphonyl chloride, 5 g. (0.44 mole) in benzene was added to the cooled, well-stirred Grignard reagent. After the addition was complete, the reaction mixture was gently refluxed for 2 hours, then allowed to stir at room temperature overnight. The mixture was cooled and hydrolyzed by adding dropwise a cold solution of 20 g. NH₄Cl in 100 ml. water. The layers were separated and the water layer washed three times with 50 ml. portions of benzene. The organic layer and washings were combined and distilled at atmospheric pressure to remove solvent. The pressure was reduced to 0.06 to 0.2 mm. and a mixture of p-chlorobibenzyl distilled over a range of 120°–142° C. and solidified immediately in the receiver. The solid distillate was recrystallized twice from benzene. A small amount of white crystals was obtained, M.P. 130–2° C. which was ascertained to be p-chlorobenzyldimethylphosphine oxide.

*Analysis.*—Calculated for $C_9H_{12}OPCl$: C, 53.3%; H, 5.9%. Found: C, 54.0%; H, 5.7%.

*Example IV.—Preparation of tris(p-chlorobenzyl) phosphine oxide*

The compound was prepared by a Grignard reaction as follows:

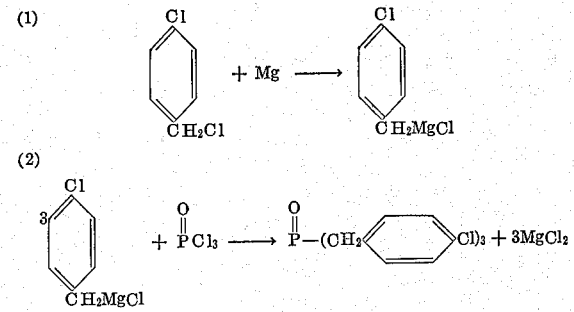

The Grignard reagent was prepared in the usual manner from p-chlorobenzyl chloride, 80.5 g. (0.5 mole), and magnesium, 12 g. (0.5 gram atom), in ethyl ether. Phosphorus oxychloride, 19.2 g. (0.125 mole), was added to the cooled well-stirred Grignard reagent. After the addition was complete, the reaction mixture was gently refluxed for 1½ hours. The mixture was then cooled and hydrolyzed by adding dropwise a cold solution of 50 g. NH₄Cl in 250 ml. water. The layers were separated and the water layer washed three times with 50 ml. portions of ether. The combined ether layer and washings were distilled to remove the ether. The residue was crystallized from a mixture of benzene and petroleum ether. The yellow crystals, contaminated by a viscous liquid, were recrystallized three more times from a benzene-petroleum ether mixture. A trace of white crystals was recovered, M.P. 179–180° C.

*Analysis.*—Calculated for $C_{21}H_{18}OPCl_3$: C, 59.5%; H, 4.2%; P, 7.3%; Cl, 25.2%. Found: C, 59.5%; H, 4.6%; P, 7.2%; Cl, 25.2%.

*Example V.—Preparation of tris(p-chlorobenzyl) phosphine oxide*

By a slight modification of the procedure in Example IV a somewhat better yield was obtained. The Grignard reagent was prepared in the usual manner from p-chlorobenzyl chloride, 161 g. (1.0 mole), and magnesium, 24 g. (1.0 gram atom), in ethyl ether. Phosphorus oxychloride, 38.4 g. (0.25 mole), in benzene was added to the cooled well-stirred Grignard reagent. After the addition was complete, the reaction mixture was stirred for 1½ hours maintaining the temperature at 10–20° C. during this period. The mixture was then hydrolyzed by adding dropwise a cold solution of 100 g. NH₄Cl in 500 ml. water. The layers were separated and the water layer washed three times with 50 ml. portions of ether. The combined ether layer and washings were distilled to remove solvent, and the very viscous liquid which remained was crystallized from benzene. The yellow crystals were recrystallized from benzene and washed with a little cold ether to obtain 13.0 g. (12.2% of the theoretical) of white crystals.

*Example VI.—Preparation of organo-phosphorus epoxide composition*

Bis(p-hydroxybenzyl)methylphosphine oxide 2.76 g. (0.01 mole) was dissolved in 3.68 g. (0.04 mole) epichlorohydrin and heated to 100° C. Sodium hydroxide (0.4 mole of a 30% aqueous solution) was added dropwise maintaining the pH below 9. A resinous phosphorus epoxide composition separated out.

ADVANTAGES AND UTILITY OF INVENTION

The novel compositions of this invention are fire retardant, have high temperature stability and possess the attractive mechanical and chemical resistant features of conventional epoxide compositions. These novel compositions form useful plastic, adhesive and coating materials. The compositions of this invention are also less susceptible to hydrolysis since they contain no

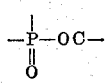

or ester type linkages.

More or less specific claims will be presented hereinafter and even though such claims are rather specific in nature, those skilled in the art to which this invention pertains will recognize that there are obvious equivalents for the specific materials recited therein. Some of these obvious equivalents are disclosed herein, other obvious equivalents will immediately occur to one skilled in the art and still other obvious equivalents could be readily ascertained upon rather simple, routine, non-inventive experimentation. Certainly no invention would be involved in substituting one or more of such obvious equivalents for the materials specifically recited in the claims. I intend that all such obvious equivalents be encompassed within the scope of this invention and patent grant in accordance with the well-known doctrine of equivalents, as well as changed proportions of the ingredients which do not render the composition unsuitable for the disclosed purposes.

What is claimed is:

1. As a new composition of matter, p-chlorobenzyl dimethylphosphine oxide having the formula

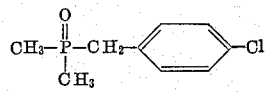

2. As a new composition of matter, bis(p-chlorobenzyl) methylphosphine oxide having the formula

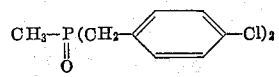

3. As a new composition of matter, tris(p-chlorobenzyl)phosphine oxide having the formula

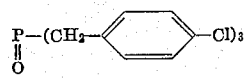

4. As a new composition of matter, bis(p-hydroxybenzyl)methyl phosphine oxide having the formula

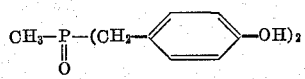

No references cited.

TOBIAS E. LEVOW, *Primary Examiner.*

W. F. BELLAMY, *Assistant Examiner.*